United States Patent
Lee et al.

(10) Patent No.: US 10,849,004 B2
(45) Date of Patent: *Nov. 24, 2020

(54) METHOD FOR TERMINAL FOR CARRYING OUT V2X COMMUNICATION IN WIRELESS COMMUNICATION SYSTEM AND TERMINAL UTILIZING THE METHOD

(71) Applicant: LG Electronics Inc., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,179

(22) Filed: Jun. 5, 2019

(65) Prior Publication Data
US 2019/0289485 A1 Sep. 19, 2019

Related U.S. Application Data

(63) Continuation of application No. 15/572,103, filed as application No. PCT/KR2016/004829 on May 9, 2016, now Pat. No. 10,327,169.
(Continued)

(51) Int. Cl.
*H04W 24/10* (2009.01)
*H04W 52/24* (2009.01)
(Continued)

(52) U.S. Cl.
CPC ............. *H04W 24/10* (2013.01); *H04W 4/46* (2018.02); *H04W 36/0061* (2013.01);
(Continued)

(58) Field of Classification Search
CPC . H04W 24/10; H04W 52/242; H04W 52/265; H04W 36/0061; H04W 72/04;
(Continued)

(56) References Cited

U.S. PATENT DOCUMENTS 6,512,750 B1    1/2003  Palenius
9,031,089 B2    5/2015  Rubin et al.
(Continued)

FOREIGN PATENT DOCUMENTS

KR    10-1338554 B1    12/2013
KR       101413843 B1     7/2014
(Continued)

OTHER PUBLICATIONS

3GPP R2-151532; Enhanced ProSe discovery for inter-carrier and inter-PLMN; Bratislava, Slovak Republic, Apr. 20-24, 2015.*
(Continued)

*Primary Examiner* — Faisal Choudhury
(74) *Attorney, Agent, or Firm* — Dentons US LLP

(57) ABSTRACT

Provided are a method for a terminal for carrying out vehicle-to-everything (V2X) communication in wireless communication system and a terminal utilizing the method. The method is characterized by acquiring resource allocation information associated with V2X communication from a neighboring cell, and reporting the resource allocation information associated with V2X communication to the serving cell.

7 Claims, 18 Drawing Sheets

Related U.S. Application Data

(60) Provisional application No. 62/158,570, filed on May 8, 2015, provisional application No. 62/181,727, filed on Jun. 18, 2015, provisional application No. 62/190,753, filed on Jul. 10, 2015, provisional application No. 62/209,309, filed on Aug. 24, 2015.

(51) Int. Cl.

| | | |
|---|---|---|
| *H04W 52/10* | (2009.01) | |
| *H04W 52/14* | (2009.01) | |
| *H04W 52/18* | (2009.01) | |
| *H04W 52/36* | (2009.01) | |
| *H04W 56/00* | (2009.01) | |
| *H04W 72/04* | (2009.01) | |
| *H04W 36/00* | (2009.01) | |
| *H04W 4/46* | (2018.01) | |
| *H04W 52/26* | (2009.01) | |
| *H04W 4/70* | (2018.01) | |

(52) U.S. Cl.
CPC .......... *H04W 52/10* (2013.01); *H04W 52/14* (2013.01); *H04W 52/18* (2013.01); *H04W 52/242* (2013.01); *H04W 52/265* (2013.01); *H04W 52/36* (2013.01); *H04W 56/00* (2013.01); *H04W 56/0045* (2013.01); *H04W 72/04* (2013.01); *H04W 72/0406* (2013.01); *B60W 2556/65* (2020.02); *H04W 4/70* (2018.02)

(58) Field of Classification Search
CPC ..... H04W 52/10; H04W 52/14; H04W 52/18; H04W 52/36; H04W 56/00; H04W 72/0406; H04W 56/0045; H04W 4/46; H04W 4/70; B60W 2556/65
USPC ......................................................... 370/328
See application file for complete search history.

(56) References Cited

U.S. PATENT DOCUMENTS

| | | |
|---|---|---|
| 2011/0183679 A1 | 7/2011 | Moon et al. |
| 2013/0099941 A1 | 4/2013 | Jana et al. |
| 2013/0159478 A1 | 6/2013 | Rousu et al. |
| 2013/0293394 A1 | 11/2013 | Rubin et al. |
| 2013/0329651 A1 | 12/2013 | Lee et al. |
| 2013/0336120 A1 | 12/2013 | Bai |
| 2014/0094216 A1 | 4/2014 | Park et al. |
| 2014/0274196 A1 | 9/2014 | Dai et al. |
| 2015/0009910 A1 | 1/2015 | Ryu ...................... H04W 72/04 370/329 |
| 2015/0215903 A1 | 7/2015 | Zhao et al. |
| 2016/0073298 A1* | 3/2016 | Brahmi ............. H04W 36/0011 455/436 |
| 2016/0105832 A1 | 4/2016 | Wu ...................... H04W 36/14 455/439 |
| 2016/0174122 A1* | 6/2016 | Sorrentino ........... H04B 1/3822 370/331 |
| 2016/0198414 A1 | 7/2016 | Yano et al. |
| 2016/0330728 A1 | 11/2016 | Sorrentino et al. |
| 2017/0231001 A1 | 8/2017 | Yang et al. |
| 2017/0290009 A1 | 10/2017 | Feng et al. |
| 2017/0295553 A1 | 10/2017 | Lee et al. |
| 2018/0049088 A1 | 2/2018 | Shiga ....................... G08G 1/09 |

FOREIGN PATENT DOCUMENTS

| | | |
|---|---|---|
| KR | 10-2015-0024691 A | 3/2015 |
| WO | 2014/012244 A1 | 1/2014 |
| WO | 2015046972 A1 | 4/2015 |
| WO | 2015065085 A1 | 5/2015 |

OTHER PUBLICATIONS

Intel Corporation, "On Support of Inter-cell D2D Discovery," 3GPP TSG RAN WG1 Meeting #76, Feb. 10-14, 2014, R1-140135.
Intel Corporation, "D2D Discovery Support in the Presence of Multiple Carriers and PLMNs," 3GPP TSG RAN WG1 Meeting #80bis, Apr. 20-24, 2015, R1-151441.
ZTE, "Inter-PLMN and Inter-frequency support," 3GPP TSG-RAN WG2 Meeting #87, Aug. 18-22, 2014, R2-143599.
Kyocera, "Enhanced ProSe discovery for inter-carrier and inter-PLMN," 3GPP TSG-RAN WG2 #89bis, Apr. 20-24, 2015, R2-151532.
Tsukamoto, et al.: "Distributed Channel Coordination in Cognitive Wireless Vehicle-to-Vehicle Communications (Invited Paper)", International Conference Wireless Access in Vehicular Environment (WAVE2008), Dearborn, Michigan, USA, Dec. 2008.
Huawei et al., "Motivation for RAN work on V2V in Rel-13", 3GPP TSG RAN Meeting #66, Maui, USA, 8-11, RP-141918, 2014.12. 02m Section 1-4.2.

* cited by examiner

METHOD FOR TERMINAL FOR CARRYING OUT V2X COMMUNICATION IN WIRELESS COMMUNICATION SYSTEM AND TERMINAL UTILIZING THE METHOD

CROSS-REFERENCE TO RELATED APPLICATIONS

This application is a continuation application of U.S. patent application Ser. No. 15/572,103 filed on Nov. 6, 2017, which is the National Stage filing under 35 U.S.C. 371 of International Application No. PCT/KR2016/004829, filed on May 9, 2016, which claims the benefit of U.S. Provisional Applications No. 62/158,570 filed on May 8, 2015, No. 62/181,727 filed on Jun. 18, 2015, No. 62/190,753 filed on Jul. 10, 2015, and No. 62/209,309 filed on Aug. 24, 2015, the contents of which are all hereby incorporated by reference herein in their entirety.

BACKGROUND OF THE INVENTION

Field of the Invention

The present invention relates to wireless communication, and more particularly, to a method of performing vehicle-to-everything (V2X) communication of a terminal in a wireless communication system, and the terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, a D2D operation may also apply to vehicle-to-everything (V2X). The V2X collectively refers to a communication technology using a vehicle and all interfaces. For example, a type of the V2X may include vehicle-to-vehicle (V2V), vehicle-to-infrastructure (V2I), vehicle-to-person (V2P), etc.

Meanwhile, a serving cell and a neighbor cell may be located on the same carrier while belonging to different public land mobile networks (PLMNs) or operators. In this case, there may be a case where a terminal needs to perform uplink transmission based on cellular communication on the carrier and perform V2X communication with the neighbor cell. In this case, if the uplink transmission always has a higher priority than the V2X communication, the V2X communication may experience severe performance deterioration. There is a need for a method capable of ensuring performance of the V2X communication.

SUMMARY OF THE INVENTION

The present invention provides a method of performing vehicle-to-everything (V2X) communication of a terminal in a wireless communication system, and the terminal using the method.

In one aspect, provided is a method of performing vehicle-to-everything (V2X) communication of a terminal in a wireless communication system. The method includes acquiring resource allocation information related to the V2X communication from a neighbor cell, and reporting the resource allocation information related to the V2X communication to a serving cell.

The neighbor cell and the serving cell may belong to different public land mobile networks (PLMNs).

The resource allocation information related to the V2X communication may be acquired by decoding system information transmitted by the neighbor cell.

Additional information may be reported together when the resource allocation information related to the V2X communication is reported to the serving cell.

The additional information may comprise at least one of a time or frequency difference between the serving cell and the neighbor cell, a physical cell identity (ID) of the neighbor cell, a resource on which the terminal performs a V2X transmission operation with a probability of at least a threshold among resources indicated by the resource allocation information related to the V2X communication, a buffer status of the terminal, and utilization of the resources indicated by the resource allocation information related to the V2X communication.

The terminal may receive a synchronization signal on a first carrier, determine synchronization of a second carrier on the basis of a synchronization signal received on the first carrier, and receive data on the second carrier on the basis of the determined synchronization.

The terminal may be a terminal installed in a vehicle.

In another aspect, provided is a terminal. The terminal includes a radio frequency (RF) unit for transmitting and receiving a radio signal and a processor operatively coupled to the RF unit. The processor acquires resource allocation information related to the V2X communication from a neighbor cell, and reports the resource allocation information related to the V2X communication to a serving cell.

When a serving cell and a neighbor cell belong to different public land mobile networks (PLMNs) or operators, which resource is used between the cells to perform uplink transmission or vehicle-to-everything (V2X) communication cannot be known. According to the present invention, a terminal acquires resource allocation information related to the V2X communication from the neighbor cell, and reports this to the serving cell. Accordingly, the serving cell may know the resource allocation information related to the V2X communication of the neighbor cell, and thus may schedule the terminal by using the resource allocation information. As a result, optionally, the V2X communication of the neighbor cell can be protected to at least a certain level.

DESCRIPTION OF EXEMPLARY EMBODIMENTS

Figure 1:
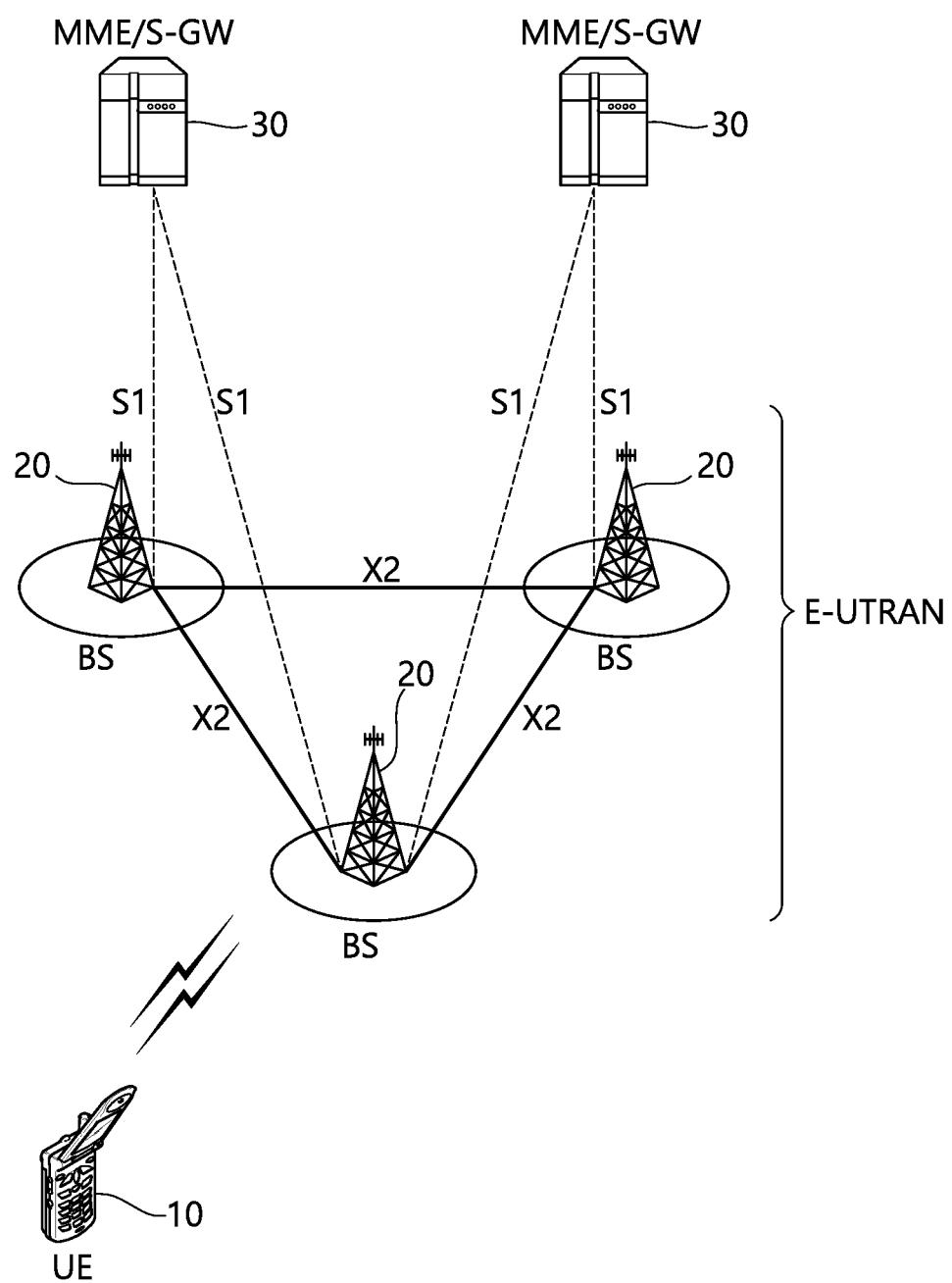
FIG. 1 shows a wireless communication system to which the present invention is applied.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
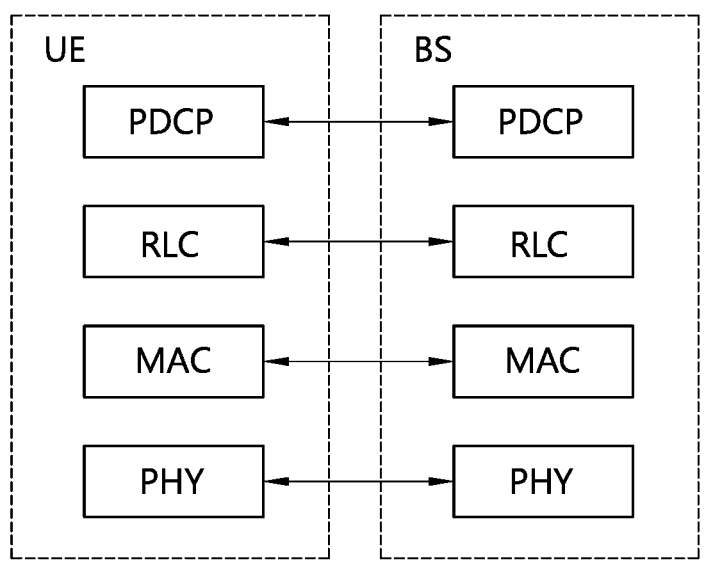
FIG. 2 is a diagram showing a wireless protocol architecture for a user plane.
Figure 3:
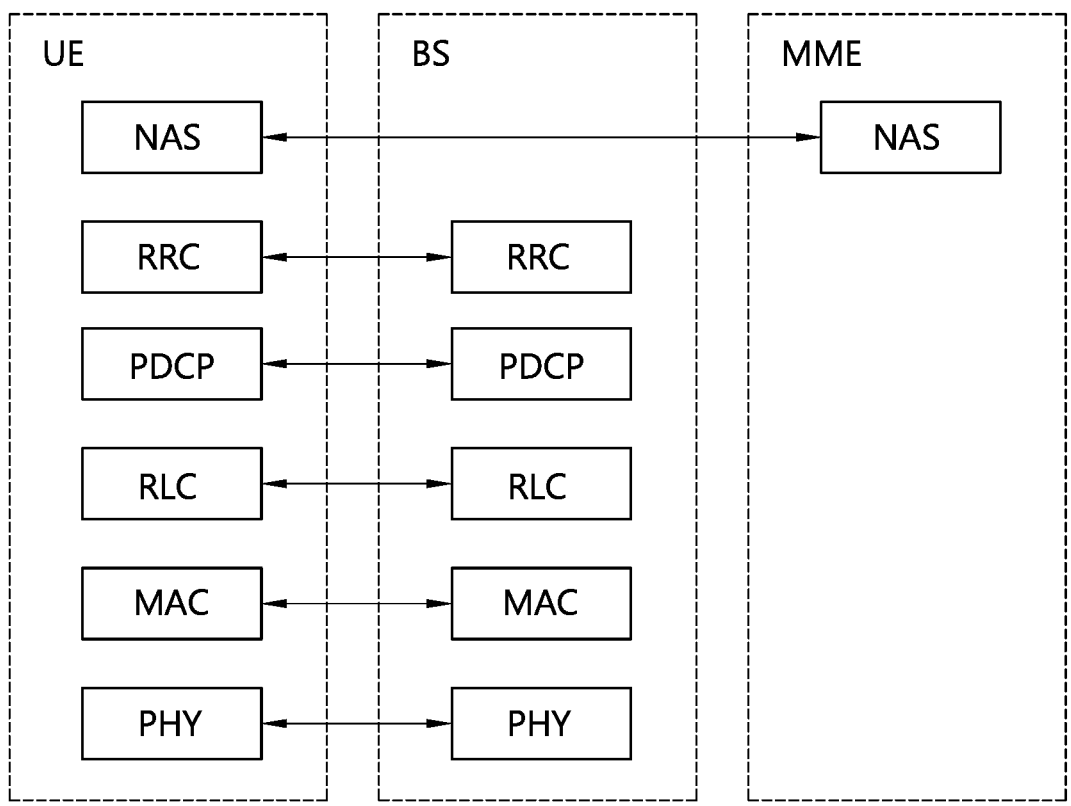
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
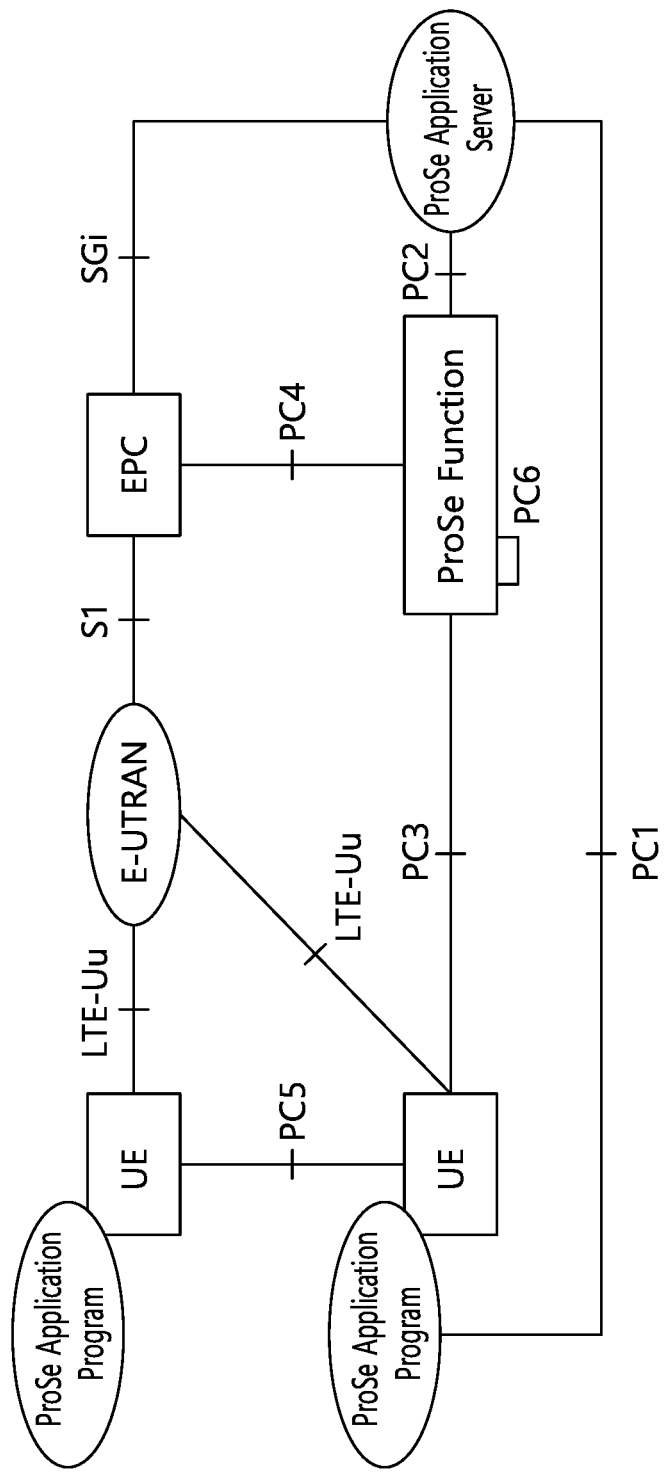
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications
Authorization and configuration of UE for discovery and direct communication
Enable the functionality of EPC level ProSe discovery
ProSe related new subscriber data and handling of data storage, and also handling of the ProSe identities
Security related functionality
Provide control towards the EPC for policy related functionality
Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

The D2D operation may be supported both when UE is serviced within the coverage of a network (cell) or when it is out of coverage of the network.

Figure 5:
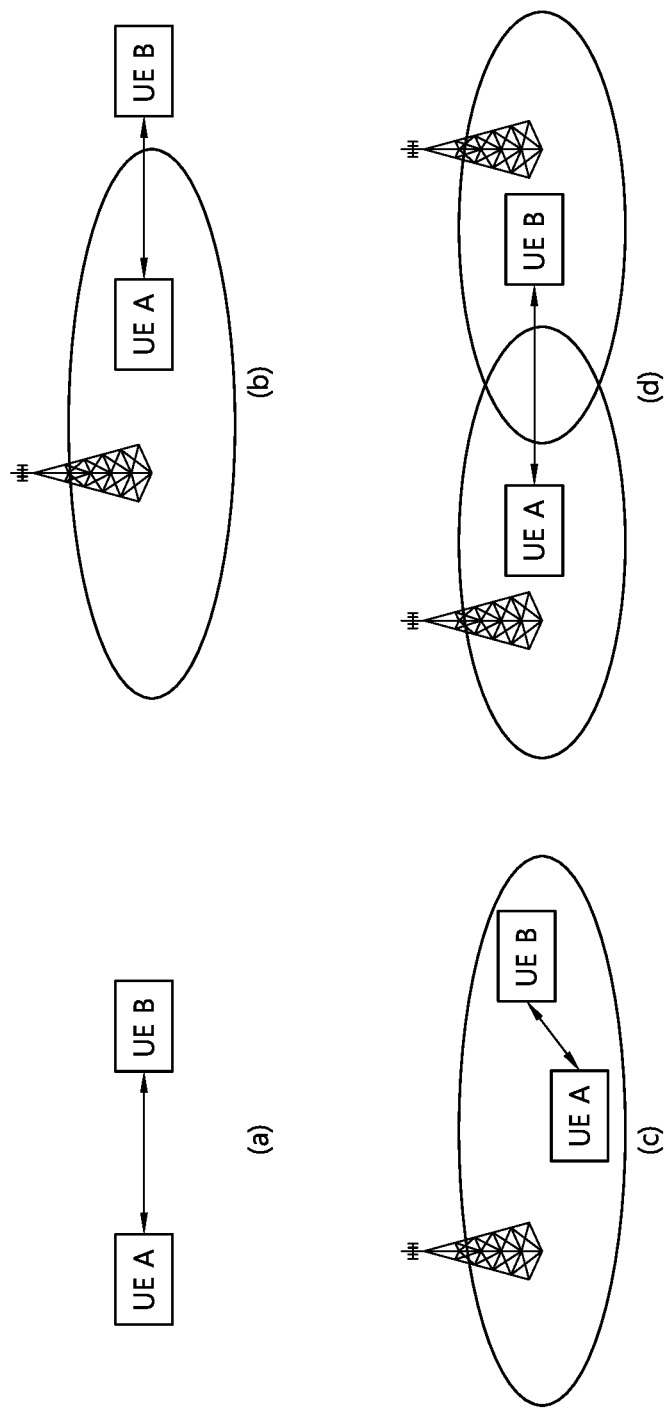
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell.

ProSe direct communication may be performed between types of UE placed at various positions as in FIG. 5.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

A PC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 6:
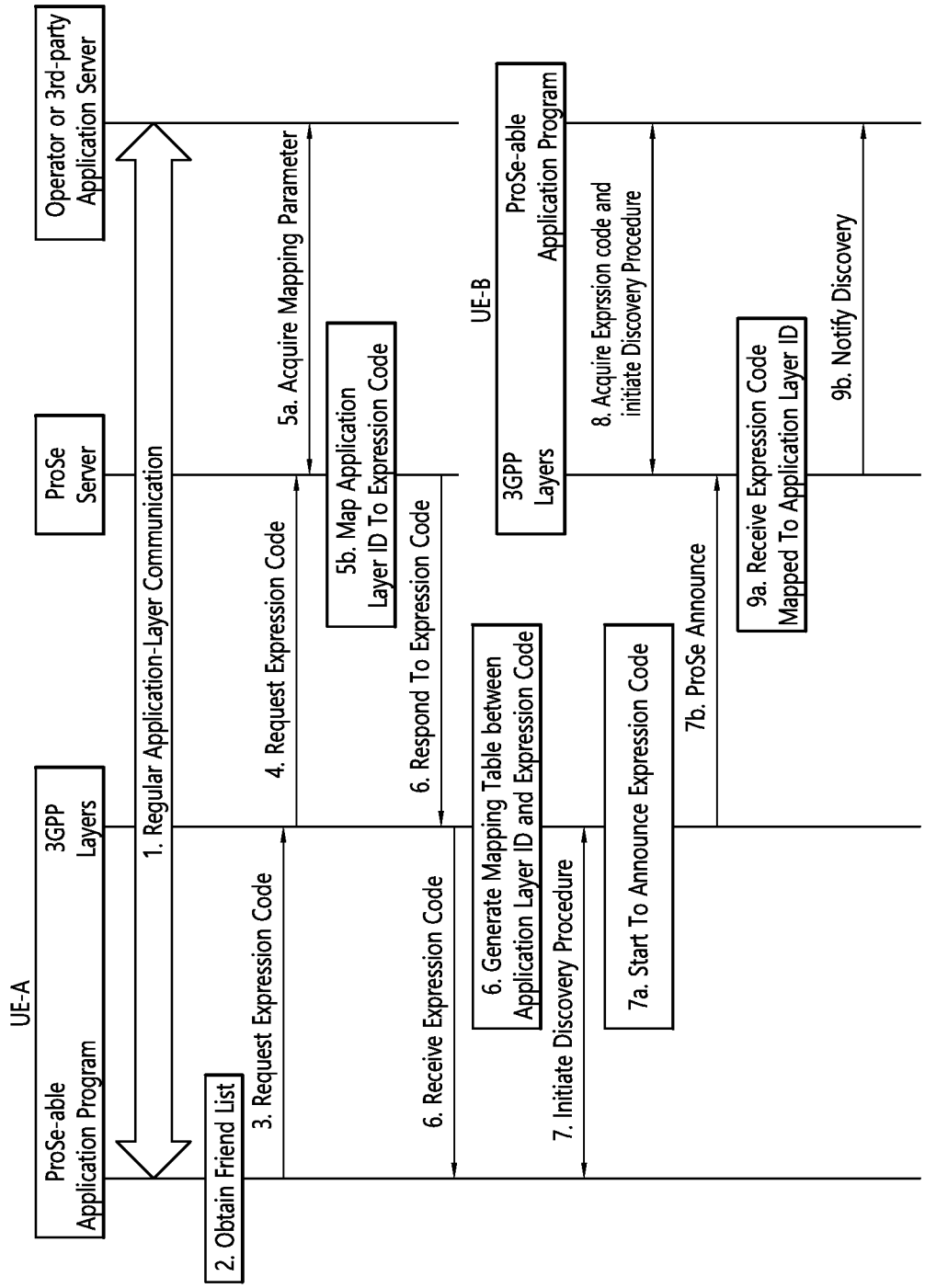
FIG. 6 is an embodiment of a ProSe discovery process.

FIG. 6 is an embodiment of a ProSe discovery process.

Referring to FIG. 6, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 6, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 6 may also be called a single step discovery procedure.

Figure 7:
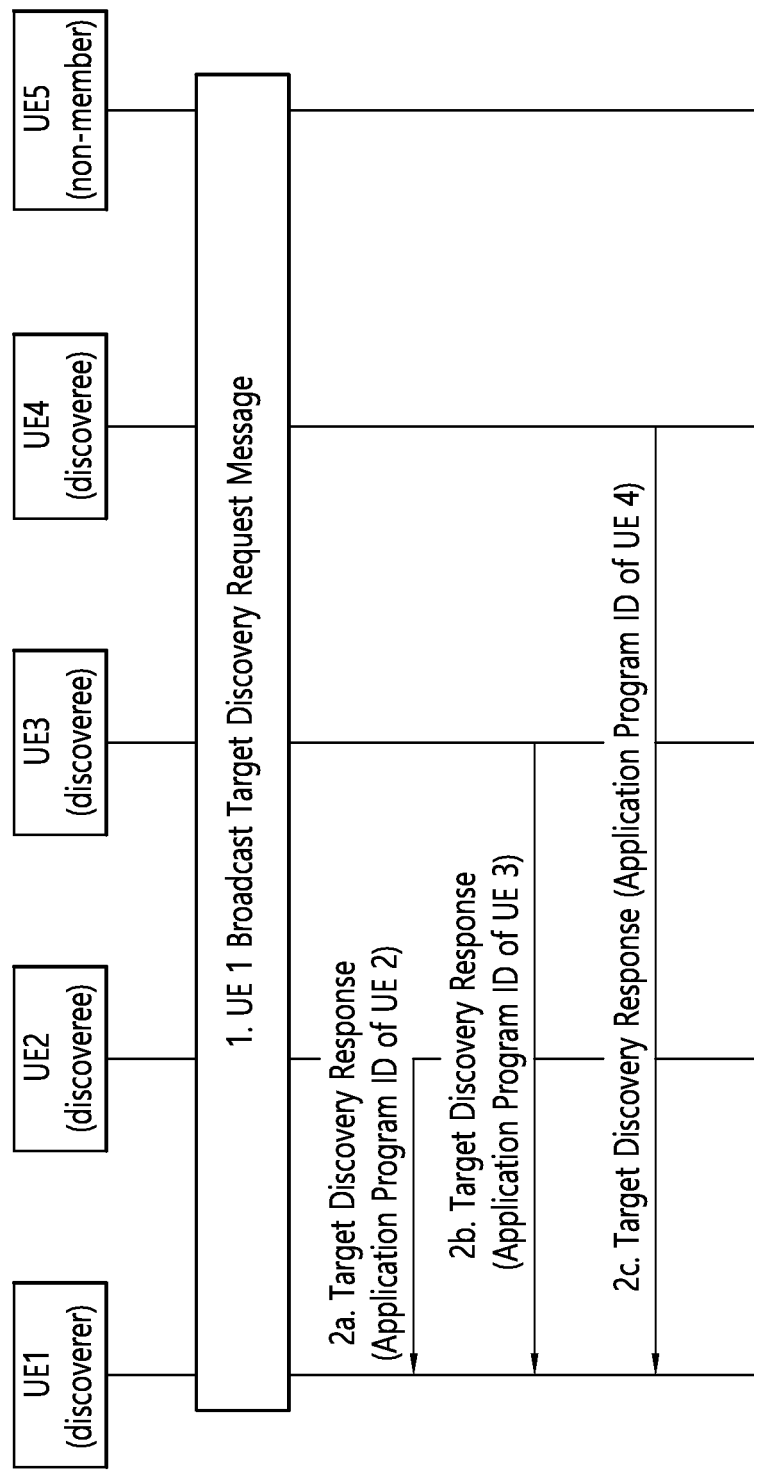
FIG. 7 is another embodiment of a ProSe discovery process.

FIG. 7 is another embodiment of a ProSe discovery process.

In FIG. 7, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 7 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 7 may be called a 2-step discovery procedure.

In addition to the discovery procedure described in FIG. 7, if the UE 1 (the discoverer) sends a discovery conform message (may be hereinafter abbreviated as an M3), that is, a response to the target discovery response message, this may be called a 3-step discovery procedure.

Meanwhile, a UE supporting D2D operation may provide relay functionality to another network node (e.g., another UE or a base station).

Figure 8:
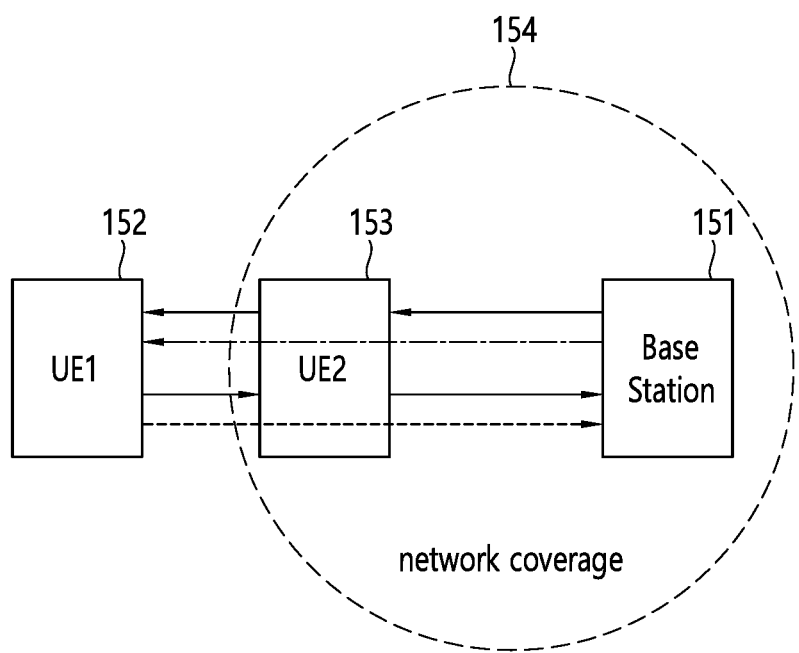
FIG. 8 shows an example of the UE providing the relay functionality.

FIG. 8 shows an example of the UE providing the relay functionality.

Referring to FIG. 8, UE2 153 performs a repeater function between the base station 151 and UE1 152. That is, the UE2 153 may be referred to as a network node that performs a relay function between the UE1 152 located outside the coverage 154 of the network and the network 151. D2D operation may be performed between UE1 and UE2 152 and 153. Conventional cellular communication or wide area network (WAN) communication may be performed between UE2 153 and network 151. In FIG. 8, since UE1 152 is located outside the network coverage, it cannot communicate with network 151 if UE2 153 does not provide the relay function therebetween.

Now, the present invention is described.

Methods described below propose a method in which, when a plurality of resources are configured for the purpose of communication from a vehicle to any other entities (this is referred to as vehicle-to-everything (vehicle-to-x: V2X)), a V2X transmission entity for transmitting a V2X signal (and/or a V2X reception entity for receiving the V2X signal) effectively selects a resource to be used in transmission (and/or reception) of a V2X signal/channel. The plurality of resources may be carriers and/or V2X resource pools.

In vehicle-to-x (V2X), 'X' may be a person or a UE, and may be denoted by V2P in this case. Alternatively, the 'X' may be a vehicle, and may be denoted by V2V in this case, instead of V2X. Alternatively, the 'X' may be a UE type or an eNB type road side unit (RSU) or an infrastructure, and may be denoted by V2I in this case, instead of V2X. In the present invention, an entity may be interpreted in the same meaning as the aforementioned 'X'.

All of a plurality of V2X resource pools used for V2X communication may be configured on one carrier or may be configured on different carriers. Alternatively, some V2X resource pools may be configured on the same carrier and the remaining V2X resource pools may be configured on different carriers.

Proposed methods described below are particularly useful when a V2X transmission entity having limited transmission capability (e.g., an entity capable of performing a V2X transmission operation simultaneously only on the limited number of carriers at a specific time) and/or a V2X reception entity having limited reception capability (e.g., an entity capable of performing a V2X reception operation simultaneously only on the limited number of carriers at a specific time) effectively select a carrier (and/or a V2X resource pool) to be used in V2X signal/channel transmission (and/or reception).

In addition, the proposed methods described below may be useful when V2X entities need to perform V2X communication by discovering each other without the aid of a network (or autonomously) since network (e.g., LTE eNB) coverage is not provided in a V2X carrier configured on an unlicensed band.

[Proposed method #1] A V2X transmission entity (and/or V2X reception entity) may preferentially use a carrier (and/or a V2X resource pool) satisfying the following (some or all) conditions (or criteria) in V2X signal/channel transmission (and/or reception). A plurality of V2X resource pools may be configured on one carrier, or some or all V2X resource pools may be configured on different carriers. When the [Proposed method #1] is applied, not only an interference problem caused by an unnecessary V2X signal/channel transmission operation of the V2X transmission entity can be mitigated but also a latency of V2X communication can be decreased.

The V2X signal/channel reception operation or the V2X signal/channel transmission operation may be performed on a carrier (and/or a V2X resource pool) on which the V2X reception entity that the V2X transmission entity is interested in (and/or the V2X transmission entity that the V2X reception entity is interested in) is present (or distributed) in a relatively great amount. That is, in corresponding V2X communication, the V2X signal/channel transmission/reception operation is performed on a V2X resource pool or a carrier having many counterparts that the V2X transmission entity (or the V2X reception entity) is interested in, that is, the V2X reception entities (or the V2X transmission entities).

On which carrier or on which V2X resource pool the number of V2X entities is great may be recognized by exchanging a (predefined (or signaled)) specific-purpose signal/channel (this is referred to as "SIG_X") including the following (some or all pieces of) information through a predefined (or signaled) resource (e.g., dedicated carrier or resource pool). The SIG_X may be defined/implemented with a separate signal/channel or may be implemented or defined in a form of a D2D discovery channel (or a D2D communication channel or a D2D synchronization signal).

The SIG_X may include at least one of the following information.

(A) Information regarding on which carrier (and/or V2X resource pool) a V2X reception (and/or V2X transmission) operation will be performed until a next SIG_X exchange period (or during a predefined (or signaled) specific time window (duration)) (or time window (duration) information for performing a V2X reception (and/or V2X transmission) operation on a specific carrier (and/or V2X resource pool) by a V2X reception entity (or V2X transmission entity))

(B) Information regarding a carrier (and/or V2X resource pool) hopping pattern performed by a V2X reception entity (and/or V2X transmission entity) during predefined (or signaled) K (SIG_X exchange) periods (or time window (duration)).

(C) Probability information for performing a V2X reception operation (and/or V2X transmission operation) on a specific carrier (and/or V2X resource pool) by a V2X reception entity (and/or V2X transmission entity) (or information on a probability that the V2X reception entity (and/or V2X transmission entity) resides on a specific carrier (and/or V2X resource pool)).

A carrier (or V2X resource pool) from which a specific V2X entity is not detected or a carrier (and/or V2X resource pool) of which reception energy of a signal/channel received from a predefined or signaled specific V2X entity is less than a specific threshold may be preferentially used by the V2X transmission entity in V2X signal/channel transmission. The specific V2X entity may be predefined or signaled. Alternatively, a carrier (or V2X resource pool) from which a specific V2X entity is detected or a carrier of which reception energy of a signal/channel received from a predefined or signaled specific V2X entity is greater than a specific threshold may be preferentially used by the V2X entity (e.g., V2X reception entity) in V2X signal/channel transmission.

The specific V2X entity may be configured as a (UE type or eNB type) RSU (and/or relay entity). Detecting of signal transmission of the specific V2X entity may be performed through (blind) detection on a predefined (or signaled) signal/channel (and/or sequence) transmitted by the specific V2X entity. Herein, the blind detection implies that a signal/channel is detected by monitoring a plurality of candidate resource regions in a state where a resource region of the signal/channel is not correctly known.

A V2X (transmission) resource pool used when signal transmission of a predefined (or signaled) specific V2X entity is detected (or when reception energy of a (predefined) signal/channel received from the predefined (or signaled) specific V2X entity is greater than a threshold) and a V2X (transmission) resource pool used when the signal/channel is not detected (or when the energy is less than the threshold) may be defined independently (or differently) on the same (or different) carrier.

In addition, the specific V2X entity may report to a different V2X entity, through a predefined (or signaled) resource (e.g., dedicated carrier, resource pool), at least one of carrier (and/or V2X resource pool) information for performing a transmission/reception operation of a signal by the specific V2X entity (during a predefined (or signaled) period (or time window (duration))), probability information for performing the transmission/reception operation of the signal on a specific carrier (and/or V2X resource pool) by the specific V2X entity, time duration information for performing a V2X reception (and/or V2X transmission) operation on the specific carrier (and/or V2X resource pool) by the specific V2X entity, and/or information regarding a hoppling pattern of a carrier (and/or V2X resource pool) related to a signal transmission/reception operation performed by the specific V2X entity.

The V2X entity may preferentially use a V2X resource pool or a carrier on which a load, utilization, or congestion is determined to be relatively low. For example, the V2X entity may preferentially use a carrier (or resource pool) on which a load, utilization, or congestion is predefined or is determined to be lower than a signaled threshold V2X related signal/channel transmission among a plurality of carriers of V2X resource pools.

A rule may be defined such that the load, utilization, and congestion related to the carrier or V2C resource pool are recognized through energy detection (or predefined signal (/channel) detection) on the V2X resource pool.

Figure 9:
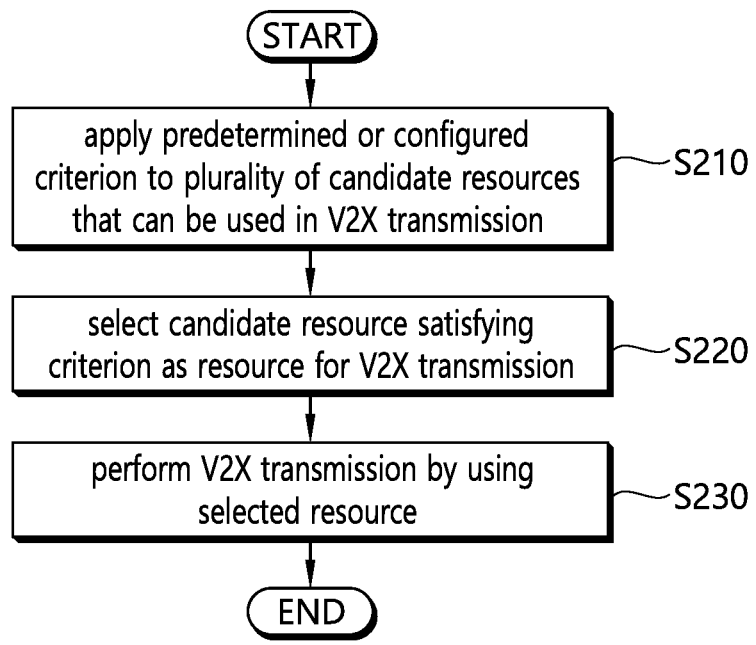
FIG. 9 shows a method of performing V2X communication of a UE.

FIG. 9 shows a method of performing V2X communication of a UE.

Referring to FIG. 9, the UE applies a predetermined or configured criterion to a plurality of candidate resources that can be used in V2X transmission (S210). Herein, the UE may be a UE installed in a vehicle, and each of the plurality of candidate resources may be a carrier or a resource pool.

The UE selects a candidate resource satisfying the criterion as a resource for V2X transmission (S220), and performs the V2X transmission by using the selected resource (S230).

Which criterion is used by the UE to select the resource for V2X transmission is described in the aforementioned [Proposed method #1]. In addition, the criterion for selecting the resource for the V2X transmission is described in greater detail in [Proposed methods #4 and #5] described below.

For example, the UE may perform the V2X transmission by using a candidate resource of which reception energy of a predetermined signal or channel received from a different UE is less than or equal to a threshold among a plurality of candidate resources. Alternatively, the V2X transmission may be restricted in a candidate resource of which reception energy of a predetermined signal or channel received from a different UE is greater than the threshold among the plurality of candidate resources.

The UE may receive from the different UE a message (the aforementioned SIG_X) for reporting a resource on which the different UE receives a V2X signal, and may perform the V2X transmission by using a resource for which the number of UEs of interest is the greatest on the basis of this message. Herein, the UE of interest may imply a target UE to which the UE intends to transmit the V2X signal.

[Proposed method #2] When the aforementioned [Proposed method #1] is applied, a rule may be defined such that a V2X transmission entity (and/or V2X reception entity) is allowed to perform a V2X signal/channel transmitting operation (and/or reception operation) during a predefined or signaled time on at least a predefined or signaled specific carrier (and/or V2X resource pool) or an emergency carrier (or V2X resource pool) used in an emergency state.

When such a rule is applied, the V2X transmission entity (and/or V2X reception entity) may (simultaneously) perform an additional V2X signal/channel transmission operation (and/or reception operation) on a different carrier (and/or resource pool) satisfying a condition (or reference) of the [Proposed method #1] if transmission capability (and/or reception capability) thereof is permitted.

A corresponding resource pool on which the additional V2X signal/channel transmission operation (and/or reception operation) is performed may be configured on a carrier different from (or the same as) a resource pool on which a minimum V2X signal/channel transmission operation (and/or reception operation) is performed.

In addition, if the [Proposed Method #2] is applied, a vehicle # X may receive an I2V message transmitted from a (UE type or eNB type) RSU during a predefined (or signaled) time on at least a predefined (or signaled) specific carrier (e.g., I2V carrier).

The I2V message may be a message transmitted by a different vehicle in order to deliver it to a vehicle # X, and may be overheard by the RSU, and thereafter may be relayed (in a broadcasting manner).

[Proposed method #3] A 'prioritized usage' and/or a 'prioritized entity' may be determined for each V2X carrier (and/or V2X resource pool) (on an unlicensed band). Information for determining the prioritized entity or entity may be delivered to a V2X entity through predefined signaling (e.g., system information block (SIB), dedicated RRC message).

For example, a V2X carrier # A (and/or V2X resource pool # A) is configured to be used (for the purpose of transmission and/or reception) only by an RSU (and/or V2X relay). Regarding a V2X carrier # B (and/or V2X resource pool # B), if a different entity other than this is configured to be used (for the purpose of transmission and/or reception), the RSU or the V2X relay may be an entity prioritized for the V2X carrier # A. Accordingly, a half duplexing problem of the RSU may be mitigated. The V2X resource pool # A and the V2X resource pool # B may be defined independently (or differently) on the same (or different) carrier.

As an example of the 'prioritized usage', a V2X carrier # C (and/or V2X resource pool # C) may be configured only for the purpose of V2X relay (transmission and/or reception) (and/or for the purpose of V2X(/V2I) (transmission and/or reception)), and a V2X carrier # D (and/or V2X resource pool # D) may be configured to be used for different (transmission and/or reception) purpose(s) other than this. The V2X resource pool # C and the V2X resource pool # D may be independently (or different) defined on the same (or different) carrier.

[Proposed method #4] A rule may be defined such that, on a (predefined (or signaled)) specific carrier (and/or specific V2X resource pool), if transmission of a predefined (or signaled) specific V2X entity is detected (or not detected) (case i) or if reception energy of a (predefined) signal/channel received from a predefined (or signaled) specific V2X entity is greater (or less) than a (predefined (or signaled)) threshold (case ii), a V2X transmission entity (and/or V2X reception entity) does not perform a V2X transmission operation (and/or V2X reception operation) on a corresponding carrier (and/or corresponding V2X resource pool).

That is, if a signal transmitted by a specific V2X entity on a specific carrier is detected or if a signal having reception energy greater than or equal to a specific value is detected, V2X transmission is supposed not to be achieved on the specific carrier since it means that a load, utilization, or congestion based on a different V2X entity is great.

Detecting of transmission of a predefined (or signaled) specific V2X entity on a (predefined (or signaled)) specific carrier (and/or specific V2X resource pool) may be performed through (blind) detection on a predefined (or signaled) signal/channel (and/or sequence) transmitted by the specific V2X entity.

For example, in the [Proposed method #4], the "specific V2X entity" may be defined as a (UE type or eNB type) RSU (and/or relay entity). Accordingly, a vehicle can be prevented from performing an unnecessary transmission operation (causing only interference) at a time at which the RSU (and/or relay entity) performs a transmission operation (i.e., a time at which the RSU cannot perform a reception operation due to a half-duplex problem).

In addition, for example, in case of applying the [Proposed method #4], a V2X transmission resource pool that can be used when transmission of a predefined (or signaled) specific V2X entity is detected (or when reception energy of a (predefined) signal/channel received from the specific V2X entity is greater than a predefined (or signaled)) threshold) and a V2X transmission resource pool that can be used when the signal/channel is not detected (or is less than a threshold) may be defined independently (or differently) on the same (or different) carrier.

[Proposed method #5] A V2X transmission entity (and/or V2X reception entity) may be allowed to regard (/assume) a (transmission) carrier (and/or V2X (transmission) resource pool) on which transmission of a predefined (or signaled) specific V2X entity is detected (or not detected) and/or a (transmission) carrier (and/or V2X (transmission) resource pool) of which reception energy of a (predefined) signal/channel received from a predefined (or signaled) specific V2X entity is greater (or less) than a threshold as a relatively low priority when selecting a (transmission) carrier (and/or V2X (transmission) resource pool) related to a V2X transmission operation. That is, it may be interpreted that whether transmission of the predefined (or signaled) specific V2X entity is detected has an effect on a priority of selecting a (transmission) carrier (and/or V2X (transmission) resource pool). The specific V2X entity may be a (UE type or eNB type) RSU (and/or relay entity).

In addition, in case of applying the [Proposed method #5], the V2X transmission entity (and/or V2X reception entity) may be allowed to regard a (reception) carrier (and/or V2X (reception) resource pool) on which a predefined (or signaled) specific V2X entity performs a reception operation as a (transmission) carrier (and/or V2X (transmission) resource pool) related to a V2X transmission operation having a relatively high (or low) priority and thereafter select it.

In addition, for example, the V2X transmission entity (and/or V2X reception entity) may be allowed to regard (/assume) a carrier (and/or V2X resource pool) on which a load, utilization, and congestion are determined to be relatively low or a carrier (and/or V2X resource pool) on which the load, utilization, and congestion are determined to be lower than a predefined (or signaled) threshold as a relatively high (or low) priority when selecting a (transmission) carrier (and/or V2X resource pool) related to a V2X transmission operation.

A specific carrier (and/or V2X resource pool) related load, utilization, and congestion may be recognized through energy detection (or predefined signal (/channel) detection) (on a corresponding specific carrier (and/or V2X resource pool)).

Herein, for example, the V2X transmission entity (and/or V2X reception entity) may be allowed not to select (/use) a carrier (and/or V2X resource pool) on which a load, utilization, and congestion are determined to be higher than a predefined (or signaled) threshold (for the purpose of transmission (and/or for the purpose of reception)) since a collision probability may be significantly great.

A carrier (and/or V2X resource pool) on which a load, utilization, and congestion are less than or equal to a predefined (or signaled) threshold and are appropriate may imply that there are sufficient (or many) different V2X (reception/transmission) entities (of interest). Therefore, a rule may be defined such that it is selected for the purpose of transmission (and/or for the purpose of reception).

Applying of such a rule may be regarded (/interpreted) that the V2X transmission entity (and/or V2X reception entity) does not select a carrier (and/or V2X resource pool) not having the different V2X (reception/transmission) entity (of interest) (for the purpose of transmission (and/or for the purpose of reception)). Alternatively, it may be regarded (/interpreted) that the different V2X (reception/transmission) entity (of interest) selects a carrier (and/or V2X resource pool) distributed with an appropriate load, utilization, and congestion as a (relatively) high priority (for the purpose of transmission (and/or for the purpose of reception)).

For another example, if a transmission resource pool and a reception resource pool related to a predefined (or signaled) specific V2X entity are both present on a carrier, the V2X transmission entity may be allowed to regard (/assume) a carrier on which (transmission of) a corresponding specific V2X entity is (rather) detected (and/or a carrier of which reception energy of a (predefined) signal/channel received from a corresponding specific V2X entity is greater than a (predefined (or signaled)) threshold) as a relatively high (or low) priority when selecting a (transmission) carrier related to a V2X transmission operation.

For another example, the V2X entity may be allowed to select a carrier (and/or V2X resource pool) determined with a load, utilization, and congestion greater than a predefined (or signaled) threshold for the purpose of reception (or for the purpose of transmission) of a (relatively) high priority, and on the contrary, select a carrier (and/or V2X resource pool) determined with a load, utilization, and congestion less than the predefined (or signaled) threshold for the purpose of transmission (or for the purpose of reception) of a (relatively) high priority.

For another example, a rule may be defined such that a V2X transmission operation based on a relatively low transmission probability (and/or TX power) (and/or a transmission resource unit configured of a relatively small number of repetitions and/or a relatively small number of resource blocks) is performed on the carrier (and/or V2X resource pool) determined as the load, utilization, and congestion greater than the predefined (or signaled) threshold.

Applying of such a rule may be interpreted that a V2X transmission operation related transmission probability and/or transmit (TX) power and/or a repetition count and/or transmission resource unit size are changed (/adjusted) according to a load, utilization, and congestion state.

Figure 10:
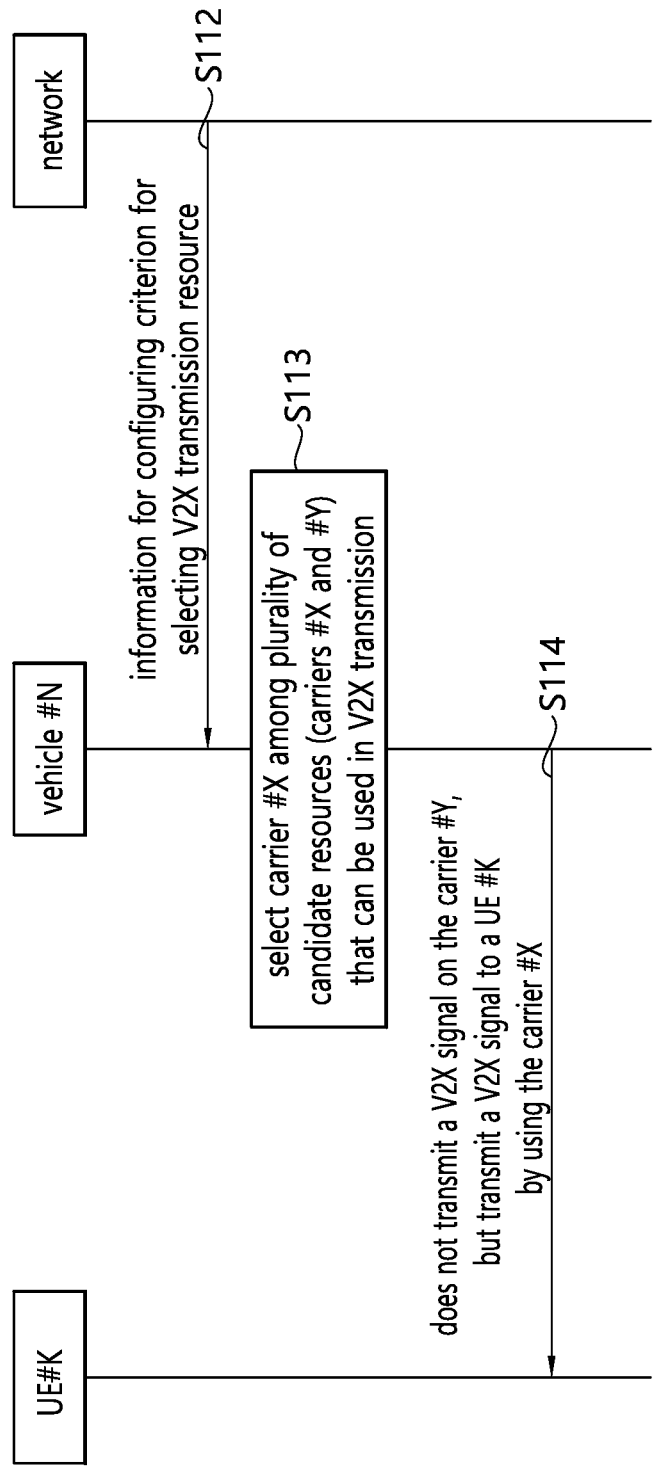
FIG. 10 shows an example of applying the proposed methods #1 to 5.

FIG. 10 shows an example of applying the proposed methods #1 to 5.

Referring to FIG. 10, a vehicle # N (more specifically, a UE installed in the vehicle # N) receives information for configuring a criterion for selecting a V2X transmission resource from a network (S112). The information may report an ID of a specific V2X entity to be detected, a threshold for reception energy of a signal/channel received from the specific V2X entity, a prioritized usage, a prioritized entity, or the like, for example, on a specific carrier or a specific V2X resource pool.

The vehicle # N may select a specific candidate resource (e.g., carrier # X) to which the aforementioned criterion is applied among a plurality of candidate resources (e.g., carriers # X and # Y) that can be used in V2X transmission (S113).

The vehicle # N does not transmit a V2X signal on the carrier # Y, but transmit a V2X signal to a UE # K by using the carrier # X (S114).

[Proposed method #6] A predefined (or signaled) specific V2X (reception) entity may be allowed to report to a different (V2X) entity, through a predefined channel (/signal), a message (this is referred to as "ALARM_MSG") indicating that it is preferred not to transmit a V2X message having a relatively lower priority than a V2X message having a high (specific) priority to the specific V2X (reception) entity since the specific V2X (reception) entity is in a state of receiving the V2X message having the high (specific) priority from a different (V2X) entity. The specific V2X (reception) entity may be defined as a (UE type or eNB type) RSU and/or a relay entity.

Figure 11:
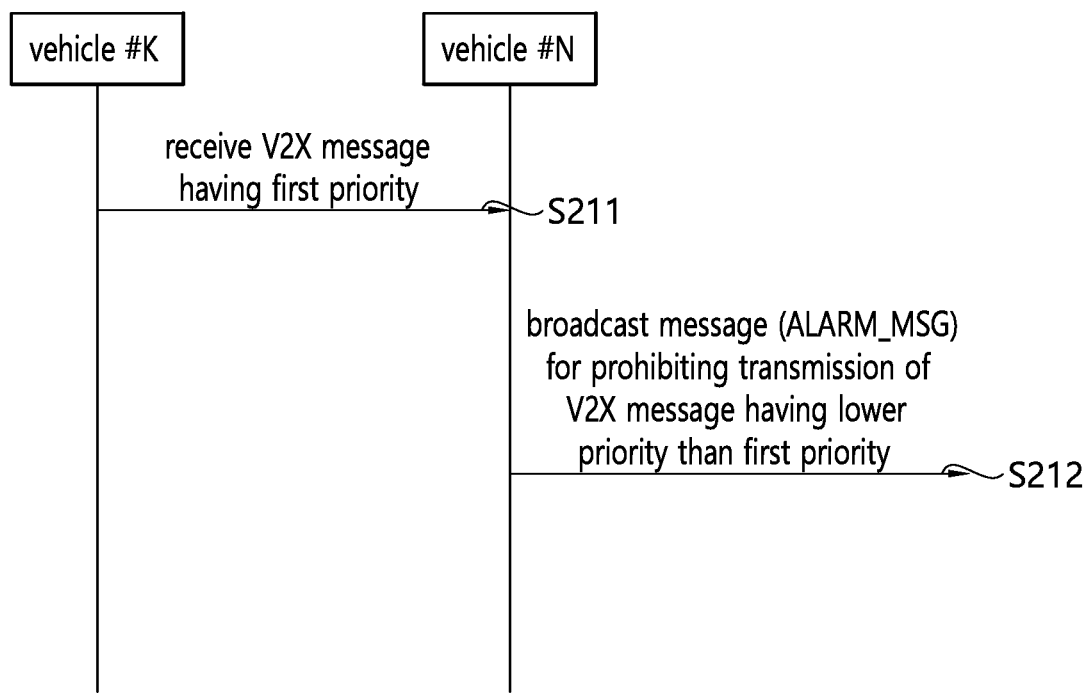
FIG. 11 shows an example of applying the proposed method #6.

FIG. 11 shows an example of applying the proposed method #6.

Referring to FIG. 11, a vehicle # N receives a V2X message having a first priority from a vehicle # K (S211). In this case, the vehicle # N broadcasts a message (referred to as an ALARM_MSG) for prohibiting transmission of the V2X message having a lower priority than the first priority (S212).

The ALARM_MSG may include at least one of ID information of a specific V2X (reception) entity, information regarding a priority, service type, QoS, and latency requirement of a V2X message currently received by the specific V2X (reception) entity, information regarding until when (or how long) the V2X message of the priority/service type/QoS/latency requirement currently received by the specific V2X (reception) entity will be received, and a power configuration parameter related to the V2X message having a relatively lower priority than the V2X message currently being received.

In addition, by applying the [Proposed method #6], a collision (/interference) problem between an unnecessary (or relatively low priority) V2X message and an important (or relatively high priority) V2X message may be mitigated.

For another example, if some (or all) of carriers configured for the purpose of V2X communication consist of carriers based on adjacent channels (in an intra band) (e.g., carrier # K, carrier # (K+1)), a predefined (or signaled) specific V2X entity may be allowed to report to a different (V2X) entity, through a predefined channel (/signal), a message indicating that it is impossible or difficult to perform a V2X reception operation in a (predefined (or signaled)) reception resource pool on a carrier # (K+1) (simultaneously) when a V2X transmission operation is performed in a (predefined (or signaled)) transmission resource pool on its carrier # K (or a message indicating that it is impossible or difficult to perform a V2X transmission operation in a (predefined (or signaled)) transmission resource pool on the carrier # (K+1) (simultaneously) when a V2X reception operation is performed in a (predefined (or signaled)) reception resource pool on its carrier # K) (this is referred to as "TXRX_SIMUL_MSG"). The specific V2X entity may be an RSU or a relay entity. That is, when a UE performs V2X transmission on a first carrier, a message (TXRX_SIMUL_MSG) may be transmitted together to indicate that a V2X signal transmitted by a different UE on a second carrier adjacent to the first carrier cannot be received.

For example, the TXRX_SIMUL_MSG may include at least one of ID information of a specific V2X entity and information indicating a carrier based on adjacent channels on which a specific V2X (reception) entity cannot simultaneously perform transmission/reception operations.

Figure 12:
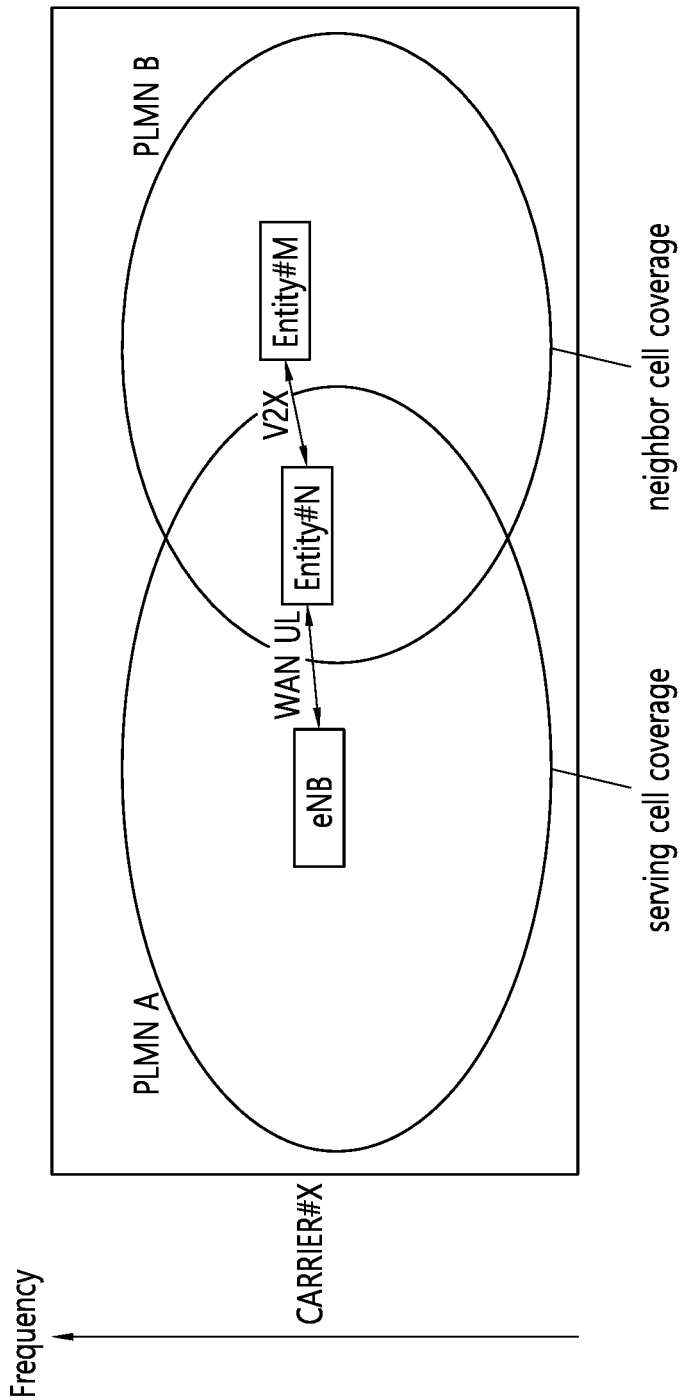
FIG. 12 shows an example in which a UE performs a V2X operation with a different UE when a serving cell and a neighbor cell belong to different PLMNs.

FIG. 12 shows an example in which a UE performs a V2X operation with a different UE when a serving cell and a neighbor cell belong to different PLMNs.

Referring to FIG. 12, an entity # N may be a UE installed in a vehicle, and an entity # M may be a UE installed in a different vehicle or an RSU. A serving cell and neighbor cell of the entity # N is located on a carrier # X. The entity # N performs WAN UL transmission with an eNB of the serving cell by using the carrier # X, and performs V2X communication with the entity # M located in the neighbor cell by using the carrier # X.

As such, if the serving cell and the neighbor cell belong to different PLMNs or operators and if a specific (common) carrier # X is used differently in the neighbor cell and the serving cell respectively for the purpose of V2X and for the purpose of WAN uplink, as shown in FIG. 12, if a (V2X) entity # N having a connection with a serving cell performs not only "serving cell related WAN uplink communication" but also "V2X communication with a neighbor cell related different (V2X) entity" on a corresponding carrier # X, the serving cell may need to ensure (or protect) corresponding V2X communication capability to at least a certain level. For example, it is also applied especially when the purpose of corresponding V2X communication is sharing of emergency information. This is because, when WAN uplink communication is configured to have a higher priority than V2X communication, if a serving cell WAN uplink transmission operation overlaps with a neighbor cell V2X reception (or transmission) operation from a perspective of the (V2X) entity # N, the neighbor cell V2X reception (or transmission) operation is always omitted, which leads to serious performance deterioration of V2X communication. In particular, such a problem may become more serious when the serving cell does not (correctly) know information regarding the neighbor cell related V2X (reception/communication) resource pool.

The following proposed methods provide a method of effectively recognizing V2X communication (carrier # X) related resource allocation information or the like by a serving cell in the aforementioned example. By applying such a method, the serving cell may protect (or ensure) ((V2X) entity # N related) neighbor cell V2X communication performance to at least a certain level.

[Proposed method #7] A (V2X) entity # N may report a neighbor cell V2X communication (carrier # X) related resource allocation information recognized or acquired by the (V2X) entity # N to a serving cell through a predefined channel (e.g., PUCCH, PUSCH, etc.) (or signaling).

This may be interpreted that the (V2X) entity # N relays neighbor cell V2X communication (carrier # X) related resource allocation information (recognized (or acquired) by the (V2X) entity # N) to the serving cell.

For example, the (V2X) entity # N may recognize or acquire the neighbor cell V2X communication (carrier # X) related resource allocation information by decoding a predefined signal/channel (e.g., SIB) received from the neighbor cell.

In addition, when the (V2X) entity # N reports neighbor cell V2X communication (carrier # X) related resource allocation information (recognized or acquired by the (V2X) entity # N) to the serving cell, at least one of the following information may be reported together, and the information may be referred to as additional information.

1) Time (/frequency) synchronization difference information between the serving cell (communication) and the neighbor cell ((V2X) communication)

2) (Physical cell) ID information of the neighbor cell (or (synchronization) ID information acquired from a neighbor cell V2X communication related synchronization signal)

3) Resource (or resource pool) (location/index) information for performing a V2X transmission operation (and/or V2X reception operation) with a relatively high probability (or a probability greater than or equal to a predefined (or signaled) threshold), among neighbor cell V2X communication (carrier # X) related resources (or resource pools)

4) (Transmission) buffer status information related to neighbor cell V2X (carrier # X) (transmission) resource (or (transmission) resource pool)

5) (Resource) utilization information (or congestion information) of neighbor cell V2X communication (carrier # X) related resources (or resource pool)

For another example, a rule may be defined such that the serving cell is allowed to recognize neighbor cell V2X communication (carrier # X) related resource allocation information or the like through direct decoding of a predefined signal/channel received from the neighbor cell.

Figure 13:
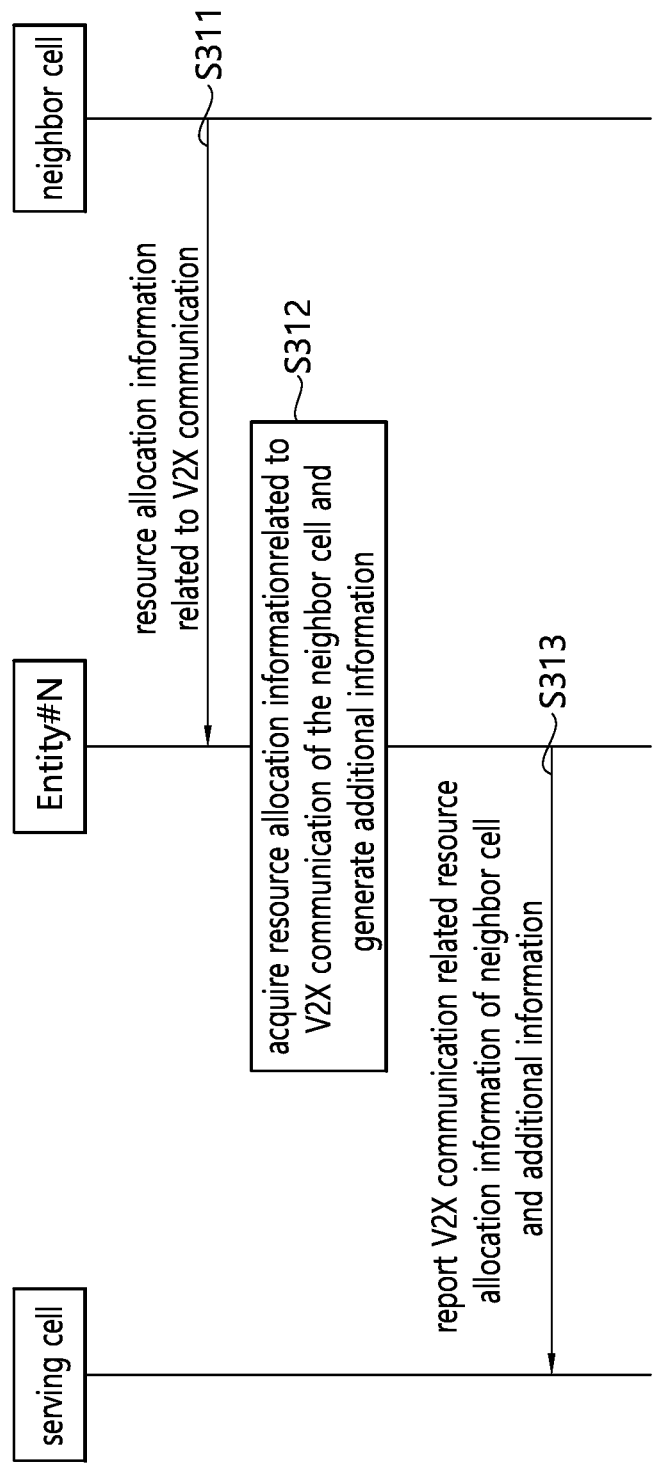
FIG. 13 shows an example of applying the proposed method #7.

FIG. 13 shows an example of applying the proposed method #7.

Referring to FIG. 13, a neighbor cell transmits resource allocation information related to V2X communication (S311). An entity # N acquires the resource allocation information related to V2X communication of the neighbor cell, and generates additional information (S312). The entity # N reports the V2X communication related resource allocation information of the neighbor cell and the additional information to the serving cell (S313). As described above, the additional information may include at least one of a time or frequency synchronization difference between the serving cell and the neighbor cell, a physical cell identity (ID) of the neighbor cell, a resource on which the UE performs a V2X transmission operation with a probability greater than or equal to a threshold among resources indicted by resource allocation information related to the V2X communication, a buffer status of the UE, and utilization of resources indicated by the resource allocation information related to the V2X communication. The neighbor cell and the serving cell may be cells operated by different public land mobile networks (PLMNs) or different operators.

[Proposed method #8] If V2X communication related control channel (SA) and/or synchronization signal (SLSS) are also transmitted, the control channel and the synchronization signal may be transmitted on a predetermined (or signaled) carrier (and/or V2X resource pool) (this is referred to as "DEDI_RSC"), and V2X (transmission (/reception)) communication on the remaining carriers (and/or V2X resource pools) may be performed according to (time/frequency) synchronization based on a synchronization signal (SLSS) transmitted (/received) on the DEDI_RSC.

Figure 14:
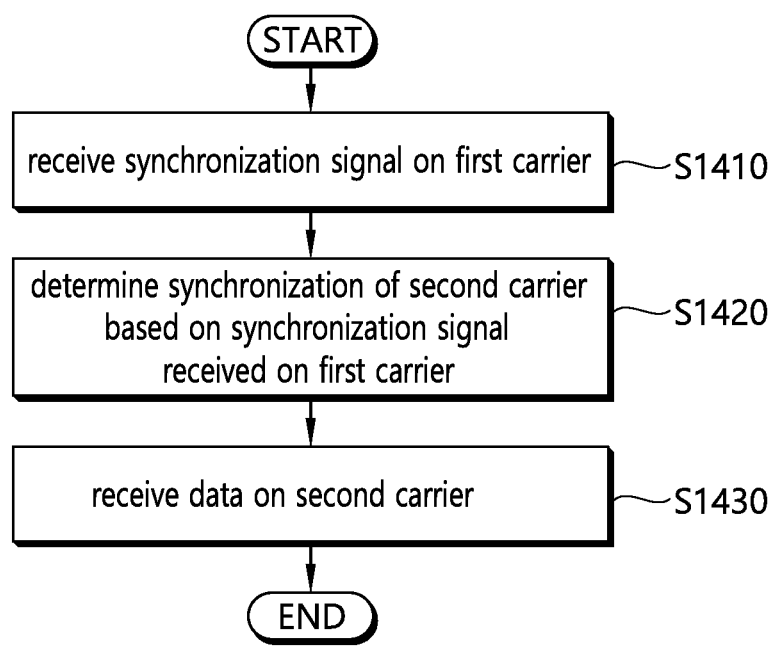
FIG. 14 shows an example of applying the proposed method #8.

FIG. 14 shows an example of applying the proposed method #8.

Referring to FIG. 14, a UE receives a synchronization signal on a first carrier (S1410).

The UE determines a synchronization of a second carrier on the basis of the synchronization signal received on the first carrier (S1420). Herein, the second carrier is a carrier having a different frequency in comparison with the first carrier.

The UE receives data on the second carrier (S1430). That is, a dedicated carrier for adjusting synchronization is configured, and when data is received on a different carrier other than the dedicated carrier, the synchronization is adjusted to the dedicated carrier. In this case, the dedicated carrier may be a different carrier other than a carrier of a primary cell.

For another example, V2X (transmission (/reception)) on the remaining carriers (and/or V2X resource pools) other than DEDI_RSC may be performed according to time synchronization (or frequency synchronization) based on a synchronization signal (SLSS) transmitted (/received) on the DEDI_RSC and frequency synchronization (or time synchronization) of the remaining carriers (and/or V2X resource pools). That is, instead of determining time/frequency synchronization of a corresponding carrier by using only a synchronization signal and control information of DEDI_RSC, the time/frequency synchronization on the corresponding carrier is determined by considering time/frequency synchronization of the corresponding carrier and the synchronization signal and control information of the DEDI-RSC.

Among the aforementioned plurality of synchronizing methods, which one is applied in V2X communication on the remaining carriers (and/or V2X resource pools) may be reported to the V2X entity by a (serving) eNB (or RSU) through predefined signaling.

If a carrier on which V2X communication related control channel (SA) is transmitted is different from a carrier on which a data channel (scheduled from the control channel (SA)) is transmitted, a carrier indicator field (CIF) may be defined (/included) on the control channel (SA) to report a specific carrier on which the data channel is scheduled.

For another example, the V2X entity may be allowed to select a carrier (and/or V2X resource pool) of which reference signal received power (RSRP) of a signal (/channel) received from a predefined (or signaled) V2X entity (e.g., RSU or relay entity) is greater (or less) than a predefined (or signaled) threshold for the purpose of (relatively) high priority transmission (and/or for the purpose of reception).

[Proposed Method #9]

Figure 15:
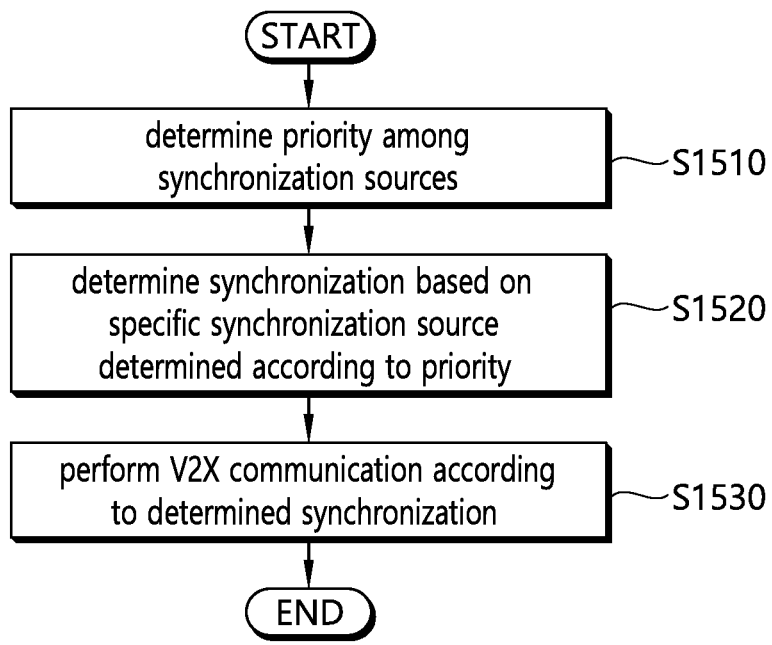
FIG. 15 shows an example of determining a synchronization source when a UE performs V2X communication.

FIG. 15 shows an example of determining a synchronization source when a UE performs V2X communication.

Referring to FIG. 15, the UE determines a priority among synchronization sources (S1510). A rule may be defined such that the UE for performing V2X, that is, V2X entity, selects the synchronization source according to the following (some or all) priories. In the following cases 1) to 11), the case 1) has a highest priority, and the case 11) has a lowest priority.

1) A synchronization signal transmitted from an eNB when an S-criterion is satisfied. 2) A synchronization signal sequence generated on the basis of an in-coverage synchronization ID used by only in-coverage D2D UEs, as a synchronization signal transmitted from a D2D U in network coverage. 3) A synchronization signal sequence generated on the basis of an in-coverage synchronization ID used by only an in-coverage RSU, as a synchronization signal transmitted from an RSU in network coverage. 4) A synchronization signal sequence generated on the basis of an in-coverage synchronization ID used by only an in-coverage V2V relay entity, as a synchronization signal transmitted from a V2V relay entity in network coverage. 5) A synchronization signal sequence generated on the basis of an in-coverage synchronization ID used by only an in-coverage V2V entity, as a synchronization signal transmitted from a V2V entity (including a V2V relay) in network coverage. 6) A synchronization signal sequence generated on the basis of an in-coverage synchronization ID, as a synchronization signal transmitted from a D2D UE located out of network coverage. 7) A synchronization signal sequence generated on the basis of an in-coverage synchronization ID, as a synchronization signal transmitted from an RSU located out of network coverage. 8) A synchronization signal sequence generated on the basis of an in-coverage synchronization ID, as a synchronization signal transmitted from a V2V entity (including a V2V relay) located out of network coverage. 9) A synchronization signal sequence generated on the basis of an out-of-coverage synchronization ID, as a synchronization signal transmitted from a D2D UE located out of network coverage. 10) A synchronization signal sequence generated on the basis of an out-of-coverage synchronization ID, as a synchronization signal transmitted form an RSU located out of network coverage. 11) A synchronization signal sequence generated on the basis of an out-of-coverage synchronization ID, as a synchronization signal transmitted from a V2V entity (including a V2V relay) located out of network coverage.

In the above case, the 'RSU' may be (limitedly) interpreted as an eNB type RSU (or UE type RSU). In addition, for example, from a perspective of a specific V2X entity, if a plurality of synchronization sources having the same priority are detected, a final synchronization source may be selected when reception strength of a predefined signal (and/or channel) (e.g., synchronization signal) (or reception strength of a reference signal (e.g., PSBCH decoding DM-RS) used in decoding of a predefined channel) is the greatest.

The UE determines synchronization on the basis of a specific synchronization source determined according to a priority (S1520). The UE performs V2X communication according to the determined synchronization (S1530).

For another example, a rule may be defined such that a (D2D&V2X) entity for simultaneously performing D2D and V2X communication preferentially performs the V2X reception operation on the V2X reception resource if the D2D reception resource and V2X reception resource having a time (/frequency) synchronization difference greater than or equal to a predefined (or signaled) threshold (partially or completely) overlap.

For example, if the D2D reception resource and the V2X reception resource (partially or completely) overlap, the D2D reception operation in the D2D reception resource may be omitted.

Alternatively, it may be defined such that the D2D reception operation is preferentially performed on a D2D reception resource. For example, if the D2D reception resource and the V2X reception resource (partially or completely) overlap, the V2X reception operation in the V2X reception resource may be omitted.

In the present invention, it may be regarded that the "road side unit (RSU)" performs (some or all) functions (/roles) described below. The RSU may be limitedly interpreted as a UE type RSU (or eNB type RSU).

1. V2X message (or V2X information) transmission (or relay) function (/role)

For example, an RSU may transmit a V2X message (or V2X information) (received from a different RSU(s) located in coverage thereof and/or an eNB and/or a vehicle, and/or a relay entity or the like) to the different RSU(s) (located in coverage thereof) and/or an eNB and/or a vehicle and/or a relay entity or the like.

2. Synchronization Reference Role (/Function)

For example, an RSU may (periodically) transmit a synchronization signal if a predefined (or signaled) condition is satisfied.

Herein, for example, the condition may be defined as a case where a dedicated (RRC) indicator indicating synchronization signal transmission is received (from an eNB), or a case where RSRP between the eNB and the RSU is less (or greater) than or equal to a predefined (or signaled) threshold, or a case where a different synchronization reference (V2X entity) is not detected in an out-of-cell/network coverage environment (and/or a case where a reference carrier capable of referring to time (/frequency) synchronization is not configured), or the like.

For example, a rule may be defined such that, among the RSUs, an RSU of which reception strength of a reference signal used in decoding of a predefined channel (e.g., a demodulation reference signal used in PSBCH decoding) is greater (or less) than a threshold uses (shares) the same synchronization signal (transmission) resource if reception strength of a predefined signal (and/or channel) (e.g., synchronization signal) is greater (less) than or equal to a threshold. That is, single frequency network (SFN) transmission of the synchronization signal is possible.

3. Measurement Signal Transmission Role (/Function)

For example, in order for a different V2X entity (e.g., vehicle, relay entity, different RSU, etc.) to measure (/estimate) a pathloss between an RSU # A as a road side unit and the different V2X entity, the RSU # A as the road side unit may be configured to (periodically) transmit a signal (e.g., synchronization signal) (and/or a channel and/or a reference signal (e.g., a demodulation reference signal for PSBCH decoding)) for the purpose of measuring (/estimating) the predefined pathloss. The pathloss may be used, for example, in TX power determination/calculation.

Hereinafter, a method of effectively determining TX power when a V2X transmission entity transmits a V2X signal/channel (at a specific time) is described.

Figure 16:
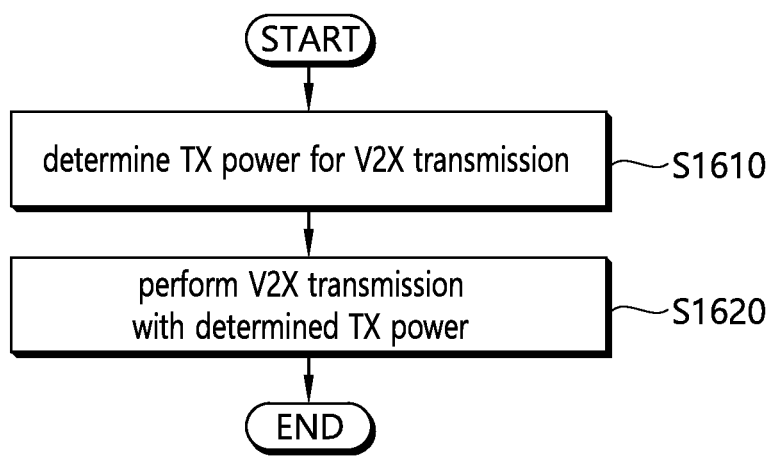
FIG. 16 shows a method of determining TX power of a UE for performing vehicle-to-everything (V2X) communication.

FIG. 16 shows a method of determining TX power of a UE for performing vehicle-to-everything (V2X) communication.

Referring to FIG. 16, the UE determines the TX power for V2X transmission (S1610). The UE transmits a V2X signal to a different UE with the determined TX power (S1620). In this case, the TX power for the V2X transmission is determined by using a second parameter set independent of a first parameter set used when the UE transmits a signal to an eNB. That is, the first parameter set used when the UE performs uplink transmission to the eNB may be the existing parameters, and the second parameter set may be parameters for determining the TX power when the UE performs the V2X transmission. The second parameter set includes at least one of a pathloss, open-loop parameter, power offset value, and maximum TX power used to determine TX power for the V2X transmission.

A method of determining the second parameter set is described in detail in the proposed methods #10 and #11.

[Proposed method #10] The proposed method #10 describes a method of determining a second parameter set when the different UE is an RSU, that is, in V2I. Under a V2I communication (e.g., vehicle-to-RSU) environment, when a vehicle # N transmits a V2I signal/channel to a serving RSU # K, a parameter or elements required to calculate (/determine) TX power (e.g., a pathloss estimation value (P_O_V2I), an open-loop parameter (e.g., ALPHA_V2I), a power offset value considering a V2I signal/channel related resource block amount (/count) (this is referred to as "NRB_V2I"), maximum V2I signal/channel TX power, etc.) may be configured (/determined) according to the following (some or all) rules.

Herein, for example, in case of the serving RSU # K of the vehicle # N, from a perspective of the vehicle # N, it may be interpreted that reception strength of a predefined signal (and/or channel) (e.g., synchronization signal) transmitted from the RSU (or reception strength of a reference signal used to decode a predefined channel (e.g., a demodulation reference signal used to decode a PSBCH)) is the greatest from a perspective of the vehicle # N. That is, when the UE receives the synchronization signal or the reference signal from a plurality of RSUs, an RSU which transmits a synchronization signal or reference signal having the greatest reception strength may be a serving RSU.

In addition, in the aforementioned example, a final V2I signal/channel TX power value may be determined by the following equation.

$$\text{final } V2I \text{ signal/channel } TX \text{ power value} = MIN\{\text{MAXIMUM } V2I \text{ signal/channel } TX \text{ power}, 10 \text{ LOG } 10(NRB\_V2I) + P\_O\_V2I + ALPHA\_V2IPL\} \quad \text{[Equation 1]}$$

Herein, MIN{X,Y} is a function for deriving a relatively smaller (or smaller or identical) value between X and Y as a resultant value.

(A) Pathloss Estimation

A signal used for a predefined usage and received from the serving RSU # K (e.g., a synchronization signal or a reference signal (e.g., a PSBCH decoding DM-RS)) may be referred to as "M_SIG". Pathloss estimation may be performed on the basis of the M_SIG.

In this case, even if the vehicle # N is located in coverage of an eNB (or network), pathloss estimation related to a V2I signal/channel TX power calculation (/determination) may be performed (independently) on the basis of the M_SIG instead of the existing CRS (or CSI_RS) received from the eNB.

Herein, for example, a rule may be defined such that a serving RSU # K related M_SIG TX power (configuration) value is reported by the serving RSU # K (or eNB (or network)) to the vehicle # N through a predefined channel (/signal).

(B) Open-Loop Parameter (e.g., P_O_V2I, ALPHA_V2I)

It is possible to apply a V2I communication related open-loop parameter configured (or signaled (from the serving RSU # K (or eNB (or network)))) independent of a V2V communication related open-loop parameter (and/or a V2V relay communication related open-loop parameter and/or a WAN uplink communication related open-loop parameter and/or a D2D communication related open-loop parameter).

Herein, for example, an independent (or different) open-loop parameter may be configured for each V2I resource pool. Alternatively, regarding the V2I signal/channel, an independent (or different) open-loop parameter may be configured for a V2I data (/control) channel and a V2I synchronization signal.

(C) Power Offset Value Considering Allocated Resource Block Amount (/Count) Related to V2I Signal/Channel The power offset value may be calculated through an equation such as 10 LOG 10 (NRB_V2I). Herein, NRB_V2I information may be reported by the serving RSU # K (or eNB (or network)) to the vehicle # N through a predefined channel (/signal).

(D) Maximum V2I Signal/Channel TX Power

It is possible to apply V2I communication related maximum signal/channel TX power configured (or signaled (from the serving RSU # K (or eNB (or network)))) independent of V2V communication related maximum signal/channel TX power (and/or V2V relay communication related maximum signal/channel TX power and/or D2D communication related maximum signal/channel TX power).

Figure 17:
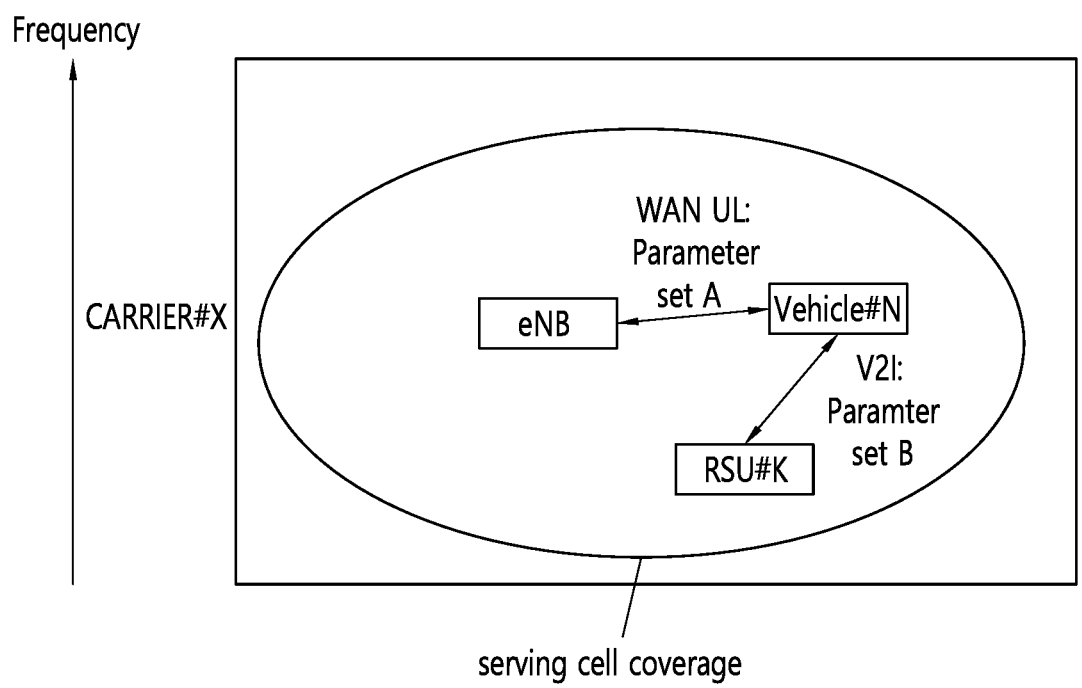
FIG. 17 illustrates an example of applying the proposed method #10.

FIG. 17 illustrates an example of applying the proposed method #10.

Referring to FIG. 17, a vehicle # N is located in cell coverage of an eNB, and uses a parameter set A when determining TX power to be applied to perform WAN uplink communication with the eNB. The parameter set A corresponds to the aforementioned first parameter set. The vehicle # N uses a parameter set B when determining TX power to be applied to perform V2I communication with the RSU # K. The parameter set B corresponds to the aforementioned second parameter set.

Each of the parameter sets A and B may include, for example, a pathloss. In this case, the pathloss included in the parameter set A is estimated by measuring a CRS or CSI-RS transmitted by the eNB, whereas the pathloss included in the parameter set B may be estimated by measuring a synchronization signal transmitted by the RSU # K or a DM-RS for PSBCH decoding. That is, even if the vehicle # N is located in coverage of the serving cell, when V2I communication is performed, instead of using the existing parameter for determining TX power, a parameter independent thereof is used.

[Proposed method #11] The proposed method #11 describes a method of determining a second parameter set in a situation where a first UE located in a first vehicle transmits a V2X signal to a second UE located in a second vehicle, that is, in a V2V communication situation.

Under the V2V communication environment, when a vehicle # N transmits a V2V signal/channel to a different vehicle # K, elements required to calculate (/determine) TX power (e.g., a pathloss estimation value, an open-loop parameter (e.g., P_O_V2V, ALPHA_V2V), a power offset value considering a V2V signal/channel related resource block amount (/count) (this is referred to as "NRB_V2V"), maximum V2V signal/channel TX power, etc.) may be configured (/determined) according to the following (some or all) rules.

For example, the vehicle # K may be a vehicle (of interest) of which reception strength of a predefined signal (and/or channel) (e.g., synchronization signal) transmitted from the vehicle # N (or reception strength of a reference signal (e.g., PSBCH decoding DM-RS) used in decoding of the predefined channel) is greater than or equal to a predefined (or signaled) threshold. In addition, in the aforementioned example, a final V2V signal/channel TX power value may be determined by an equation such as MIM {maximum V2V signal/channel TX power, 10*LOG 10 (NRB_V2V)+ P_O_V2V+ALPHA_V2VPL}.

For another example, when the V2X transmission entity transmits a V2X message having a different QoS (or latency requirement value), final TX power may be determined by using each of an independent (or different) open-loop parameter (e.g., P_O, ALPHA) configured (or signaled) for each different QoS (or latency requirement value), maximum signal/channel TX power, or the like.

For another example, in a V2X resource pool on which the different QoS (or latency requirement value) is configured, the independent (or different) open-loop parameter (e.g., P_O, ALPHA), the maximum signal/channel TX power, or the like may be configured (or linked).

(A) Pathloss Estimation

When a signal received from the vehicle # K for a predefined corresponding usage (e.g., a synchronization signal or a reference signal such as a PSBCH decoding DM-RS) is referred to as "Q_SIG", pathloss estimation may be performed on the basis of Q_SIG.

In this case, even if the vehicle # N is in eNB (or network) coverage, pathloss estimation related to V2V signal/channel TX power calculation (/determination) may be performed (independently) on the basis of the Q_SIG other than the existing CRS (or CSI-RS) received from the eNB. For example, a rule may be defined such that a Q_SIG TX power (configuration) value related to the vehicle # K is reported by the vehicle # K (or serving RSU or eNB (or network)) to the vehicle # N through a predefined channel (/signal).

It may be defined such that pathloss estimation based on Q_SIG received from the vehicle # K is not performed, by considering that ALPHA_V2V is set to 0.

(B) Open-Loop Parameter (e.g., P_O_V2V, ALPHA_V2V)

It is possible to apply a V2V communication related open-loop parameter configured (or signaled (from the vehicle # K (or serving RSU or eNB (or network)))) independent of a V2I communication related open-loop parameter (and/or a V2V relay communication related open-loop parameter and/or a WAN uplink communication related open-loop parameter and/or a D2D communication related open-loop parameter).

For example, an independent (or different) open-loop parameter may be configured for each V2V resource pool. For example, regarding the V2V signal/channel, an independent (or different) open-loop parameter may be configured for a V2V data (/control) channel and a V2V synchronization signal.

(C) Power Offset Value Considering Allocated Resource Block Amount (/Count) Related to V2V Signal/Channel The offset value may be calculated through an equation such as 10 LOG 10 (NRB_V2V). Herein, for example, a rule may be defined such that NRB_V2V information is reported by the vehicle # K (or the serving RSU or the eNB (or the network)) to the vehicle # N through a predefined channel (/signal).

(D) Maximum V2V Signal/Channel TX Power

It is possible to apply V2V communication related maximum signal/channel TX power configured (or signaled (from (the vehicle # K (or the serving RSU or the eNB (or the network))))) independent of V2I communication related maximum signal/channel TX power (and/or V2V relay communication related maximum signal/channel TX power and/or D2D communication related maximum signal/channel TX power).

Examples for the aforementioned proposed method can be included as one of implementation methods of the present invention, and thus can be apparently regarded as a sort of proposed methods. In addition, although the aforementioned proposed methods can be independently implemented, it is also possible to be implemented by combining (or merging) some proposed methods. For example, although the proposed method is described on the basis of a 3GPP LTE/ LTE-A system for convenience of explanation, a system to which the proposed method is applied can also be extended to another system other than the 3GPP LTE/LTE-A system. For example, the proposed methods of the present invention can also be extendedly applied for D2D communication. Herein, the D2D communication implies that a UE communicates with a different UE directly by using a radio channel. For example, although the UE implies a user terminal, when a network device such as an eNB transmits/receives a signal according to a communication scheme between UEs, the UE may also be regarded as a sort of the UE. A rule may be defined such that the aforementioned proposed methods are limitedly applied only under an FDD system (and/or TDD system) environment. For example, a rule may be defined such that the aforementioned proposed methods are limitedly applied only to mode-2 communication and/or type-1 discovery (and/or mode-1 communication and/or type-2 discovery). In addition, for example, a rule may be defined such that the aforementioned proposed methods are limitedly applied only to an in-coverage D2D UE (and/or out-of-coverage D2D UE) (and/or an RRC_connected state D2D UE (and/or RRC_idle state D2D UE) and/or a relay D2D UE (and/or a remote UE (participating in relay communication))). For example, a rule may be defined such that the aforementioned proposed methods are limitedly applied only to a D2D UE for performing only a D2D discovery (transmission (reception)) operation (and/or a D2D UE for performing only a D2D communication (transmission (/reception) operation)). For example, a rule may be defined such that the aforementioned proposed methods are limitedly applied only to a scenario in which only D2D discovery is supported (configured) (and/or a scenario in which only D2D communication is supported (configured)). For example, a rule may be defined such that the aforementioned proposed methods are limitedly applied only to a case of performing a D2D discovery signal reception operation on a different inter-frequency (UL) carrier (and/or a case of performing a D2D discovery signal reception operation on a different PLMN (UL) carrier between PMLNs).

Figure 18:
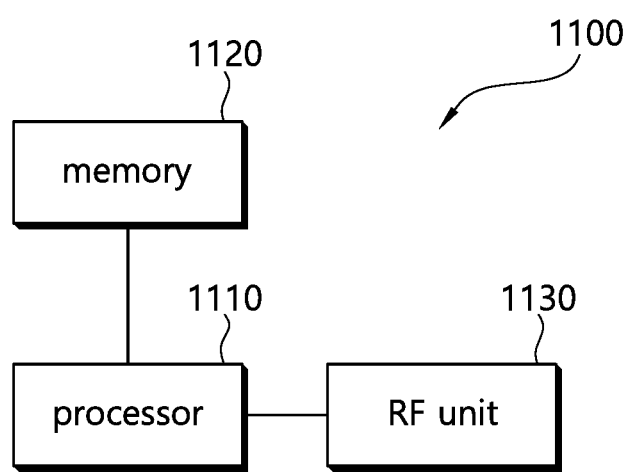
FIG. 18 is a block diagram illustrating the user device in which an embodiment of the present invention is implemented.

FIG. 18 is a block diagram of a UE according to an embodiment of the present invention.

Referring to FIG. 18, a UE 110 includes a processor 1110, a memory 1120, and a radio frequency (RF) unit 1130. The processor 1110 implements the proposed function, procedure, and/or method.

The RF unit 1130 is connected to the processor 1110 to transmit and receive radio signals.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method for acquiring resource allocation information related to vehicle-to-everything (V2X) communication in a wireless communication system, the method performed by a base station and comprising:

receiving resource allocation information related to the V2X communication from a terminal, wherein the resource allocation information related to the V2X communication informs the base station of a resource allocated to the terminal for performing the V2X communication on a first carrier of a neighbor cell, wherein the first carrier is used by the terminal to perform uplink communication on a serving cell controlled by the base station, allocating resources to the terminal based on the V2X communication on the first carrier of the neighbor cell and the uplink communication on the first carrier of the serving cell.

2. The method of claim 1, wherein the resource allocation information related to the V2X communication is transmitted through a predefined channel.

3. The method of claim 1, wherein the base station transmits a resource allocation information request message to the terminal before receiving the resource allocation information related to the V2X communication.

4. The method of claim 1, wherein the base station receives additional information when the base station receives the resource allocation information related to the V2X communication.

5. The method of claim 4, wherein the additional information comprises at least one of a time or frequency difference between the serving cell and the neighbor cell, a physical cell identity (ID) of the neighbor cell, a resource on which the terminal performs a V2X transmission operation with a probability of at least a threshold among resources informed by the resource allocation information related to the V2X communication, a buffer status of the terminal, and utilization of the resources indicated by the resource allocation information related to the V2X communication.

6. The method of claim 1, wherein the terminal is a terminal installed in a vehicle.

7. A base station comprising:

a transmitter and a receiver for transmitting and receiving a radio signal; and a processor operatively coupled to the transmitter and the receiver, wherein the processor receives resource allocation information related to the V2X communication from a terminal, wherein the resource allocation information related to the V2X communication informs the processor of a resource allocated to the terminal for performing the V2X communication on a first carrier of a neighbor cell, wherein the first carrier is used by the terminal to perform uplink communication on a serving cell controlled by the base station, wherein the processor allocates resources to the terminal based on the V2X communication on the first carrier of the neighbor cell and the uplink communication on the first carrier of the serving cell.

* * * * *